United States Patent
Maar et al.

(10) Patent No.: US 11,788,415 B2
(45) Date of Patent: Oct. 17, 2023

(54) SHROUDLESS BLADE FOR A HIGH-SPEED TURBINE STAGE

(71) Applicant: MTU Aero Engines AG, Munich (DE)

(72) Inventors: Karl Maar, Pfaffenhofen an der Ilm (DE); Joerg Frischbier, Dachau (DE); Hermann Klingels, Dachau (DE); Jens Wittmer, Pfaffenhofen a. d. Ilm (DE); Martin Pernleitner, Dachau (DE)

(73) Assignee: MTU Aero Engines AG, Munich (DE)

( * ) Notice: Subject to any disclaimer, the term of this patent is extended or adjusted under 35 U.S.C. 154(b) by 322 days.

(21) Appl. No.: 16/793,717

(22) Filed: Feb. 18, 2020

(65) Prior Publication Data
US 2020/0270995 A1    Aug. 27, 2020

(30) Foreign Application Priority Data
Feb. 21, 2019   (DE) .......................... 102019202388.6

(51) Int. Cl.
*F01D 5/14*   (2006.01)
*F01D 5/28*   (2006.01)
(Continued)

(52) U.S. Cl.
CPC .............. *F01D 5/141* (2013.01); *F01D 5/20* (2013.01); *F01D 5/28* (2013.01); *B33Y 80/00* (2014.12);
(Continued)

(58) Field of Classification Search
CPC . F01D 5/141; F01D 5/148; F01D 5/20; F01D 5/28; F05D 2240/307;
(Continued)

(56) References Cited

U.S. PATENT DOCUMENTS 4,878,810 A * 11/1989 Evans ................. F01D 5/16
                                                    416/203
5,448,828 A     9/1995 Willems
(Continued)

FOREIGN PATENT DOCUMENTS

DE    4310896 C1    3/1994
DE    4436186 A1    5/1995
(Continued)

OTHER PUBLICATIONS

Wang et al.:"Integrated aerodynamic design and analysis of turbine blades," Advances in Engineering Software 68 (2014) 9-18.
(Continued)

*Primary Examiner* — Courtney D Heinle
*Assistant Examiner* — Sang K Kim
(74) *Attorney, Agent, or Firm* — Davidson, Davidson & Kappel, LLC

(57) ABSTRACT

Described is a blade for a high-speed turbine stage of an aircraft gas turbine, in particular of an aircraft engine, the blade including a radially inner blade root, and an airfoil extending radially outwardly from the blade root. It is provided that the blade be shroudless and that the airfoil have a radially outer end portion that is positionable opposite a rub surface when the blade is in an installed state, and that the airfoil have a radially inner chord length that is at least 1.1 times, preferably at least 1.2 times, in particular at least 1.3 times a radially outer chord length, the inner chord length being measured at the airfoil directly above the blade root, and the outer chord length being measured at the airfoil in the region of or below the end portion.

22 Claims, 2 Drawing Sheets

(51) Int. Cl.
*F01D 5/20* (2006.01)
*B33Y 80/00* (2015.01)

(52) U.S. Cl.
CPC .. *F05D 2220/323* (2013.01); *F05D 2240/301* (2013.01); *F05D 2240/303* (2013.01); *F05D 2240/307* (2013.01); *F05D 2300/174* (2013.01); *F05D 2300/6111* (2013.01)

(58) Field of Classification Search
CPC ......... F05D 2240/301; F05D 2240/303; F05D 2300/174
See application file for complete search history.

(56) References Cited

U.S. PATENT DOCUMENTS

| | | | |
|---|---|---|---|
| 5,476,363 A * | 12/1995 | Freling | F01D 5/20 205/110 |
| 5,480,285 A | 1/1996 | Patel et al. | |
| 5,966,525 A | 10/1999 | Manzi, Jr. et al. | |
| 6,257,828 B1 * | 7/2001 | Bischoff-Beiermann | B22C 9/04 415/200 |
| 9,464,530 B2 | 10/2016 | Kareff et al. | |
| 10,006,300 B2 | 6/2018 | Daniels et al. | |
| 2014/0301852 A1 | 10/2014 | Zscherp | |
| 2015/0315933 A1 * | 11/2015 | Do | F16N 31/00 415/112 |
| 2017/0122107 A1 * | 5/2017 | Wackers | F02C 7/36 |
| 2017/0130588 A1 | 5/2017 | Townes | |
| 2018/0030835 A1 | 2/2018 | Iida et al. | |
| 2018/0274368 A1 | 9/2018 | Mongillo et al. | |
| 2019/0136696 A1 * | 5/2019 | Dietrich | F01D 5/16 |
| 2019/0338650 A1 * | 11/2019 | Henderkott | F01D 5/187 |
| 2021/0140324 A1 * | 5/2021 | Bruni | F01D 5/20 |

FOREIGN PATENT DOCUMENTS

| | | |
|---|---|---|
| DE | 69830679 T2 | 5/2006 |
| DE | 10 2011086524 A1 | 5/2013 |
| DE | 10 2015102396 A1 | 8/2015 |
| DE | 112016000685 T5 | 12/2017 |
| EP | 0894558 A1 | 2/1999 |
| EP | 2 383434 A2 | 11/2011 |
| EP | 2842662 A1 | 3/2015 |
| EP | 3118413 A1 | 1/2017 |
| EP | 3170974 | 5/2017 |
| EP | 3244011 A2 | 11/2017 |
| EP | 1 936119 B1 | 9/2018 |
| EP | 3511522 A1 | 7/2019 |
| WO | WO 2007042522 A1 | 4/2007 |
| WO | WO2017018981 A1 | 2/2017 |

OTHER PUBLICATIONS

Roberts:"The Effect of Variable Chord Length on Transonic Axial Rotor Performance," Journal of Turbomachinery, Jul. 2002, vol. 124, 351.
Lex: "Kurzfassung Masterarbeit: Auswirkungen der Erbringung von Sekundärregelleistung auf die Lebensdauer einer Gasturbinenschaufel," Lehrstuhl für Energie-systeme der Technischen Universität München Aug. 31, 2016, see machine translation.
Chapter 5.9 of Czischos, „Das Ingenieurwissen, 34th edition, Springer Verlag, 2013, see partial translation.

* cited by examiner

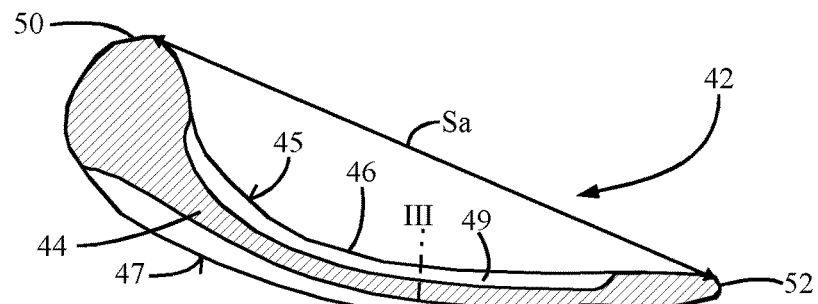
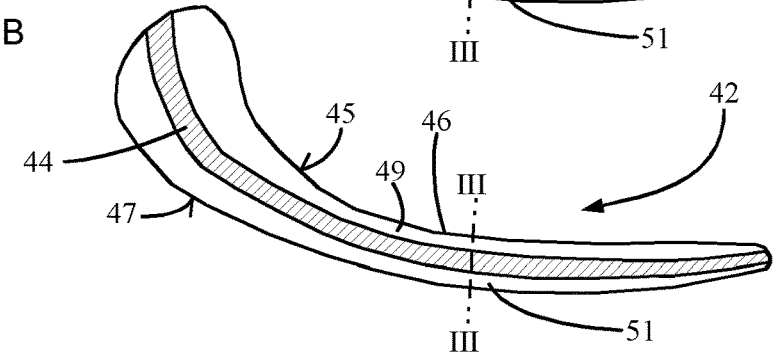
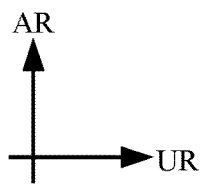
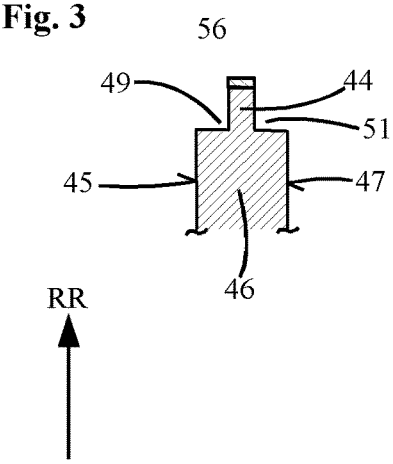
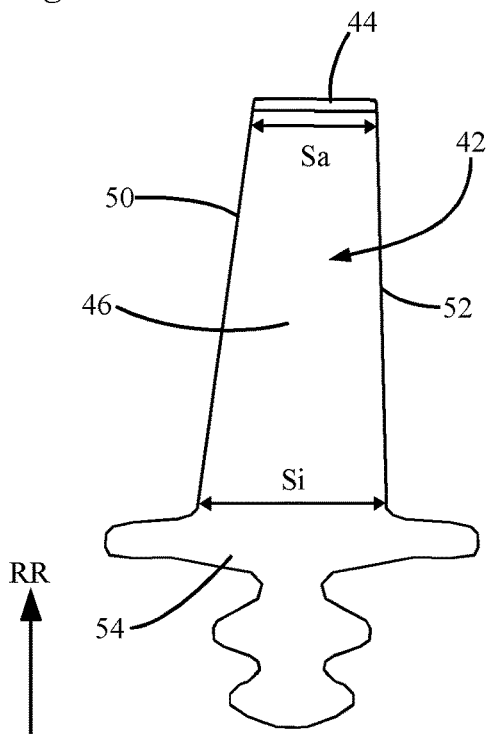

SHROUDLESS BLADE FOR A HIGH-SPEED TURBINE STAGE

The present invention relates to a blade for a high-speed turbine stage of an aircraft gas turbine, in particular of an aircraft engine.

BACKGROUND

In a high-speed turbine stage, which in particular a is a low-pressure turbine in an engine having a geared fan, also referred to as geared turbofan (GTF), the linear speed Utip at the blade tip reaches values of 300 m/s and above. In comparison, in turbine stages of conventional engines; i.e., non-high-speed turbine stages rotating at fan speed, the maximum linear speed Utip is 250 m/s.

In this context, the term "high-speed" means that the respective turbine stage is coupled to the fan; i.e., the rotor at the engine inlet, by a gearbox so that during operation, the respective rotor blade ring(s) of this turbine stage rotate(s) faster than the fan.

Directional words such as "axial," "axially," "radial," "radially," and "circumferential" are always taken with respect to the machine axis of the aircraft gas turbine, unless explicitly or implicitly indicated otherwise by the context.

In high-speed-speed turbine stages, the load on the blades and their airfoils is very high. In particular, during operation, the airfoils are exposed to higher foreign particle energy because of the higher linear speeds. Such impacts cause primary and secondary damage to the blades. The primary and secondary damage is the greater, the faster the turbine stage; i.e., the blades rotate in the hot gas stream. In addition, the acting centrifugal forces are noticed to have strong effects on the blades. It should also be borne in mind that typically nickel materials are used for such blades. When using blades made of brittle materials, correspondingly greater wear and damage are noticeable.

SUMMARY OF THE INVENTION

It is an object of the present invention to provide a blade for a high-speed turbine stage that has improved robustness in operation.

Accordingly, there is provided a blade for a high-speed turbine stage of an aircraft gas turbine, in particular of an aircraft engine, the blade including a radially inner blade root and an airfoil extending radially outwardly from the blade root. It is provided that the blade be shroudless and that the airfoil have a radially outer end portion that is positionable opposite a rub surface when the blade is in an installed state, and that the airfoil have a radially inner chord length that is at least 1.1 times, preferably at least 1.2 times, in particular at least 1.3 times a radially outer chord length, the inner chord length being measured at the airfoil directly above the blade root, and the outer chord length being measured at the airfoil in the region of or below the end portion.

"High-speed" may in particular mean that the blade is designed for an $An^2$ of $\geq 4000\ m^2/s^2$, preferably $\geq 4500\ m^2/s^2$, in particular $\geq 5000\ m^2/s^2$ at or around the ADP of the aircraft gas turbine (10) and/or is suitable and/or intended for a correspondingly designed turbine stage/aircraft gas turbine. "$An^2$" is the annulus area A at the exit of the turbine stage multiplied by the square of the rotational speed n. "ADP" stands for "Aerodynamic Design Point;" i.e., the operating condition at cruise altitude, which is also referred to as "cruise condition." In conventional, non-high-speed turbine stages, the $An^2$ at or around the ADP is significantly below $2000\ m^2/s^2$.

The shroudless design of the blade makes it possible to achieve a reduction in the rim load on the blade. By reducing mass in the radially outermost regions of the blade, the acting centrifugal forces can be significantly reduced. This makes it possible, in particular, to reduce the stresses occurring in the airfoil or blade profile. Due to the reduced stresses, the robustness against impact loads can be further improved, especially at high rotational speeds and for materials with relatively low ductility such as TiAl.

Thus, the chord length varies very strongly over the radial extent of the airfoil as compared to a conventional turbine blade, where the inner chord length is less than 10% longer than the outer chord length. This may, on the one hand, be disadvantageous from an aerodynamic standpoint, but, on the other hand, allows a particularly advantageous distribution of the mean stress and the section modulus over the blade height. This also allows the robustness against impact loads to be further improved, especially at high rotational speeds and for materials with relatively low ductility, in particular brittle materials such as TiAl.

In the region of the end portion, the airfoil may have at least one recess formed in the pressure side and/or at least one recess formed in the suction side, the end portion being disposed between the pressure-side recess and the suction-side recess. This makes it possible to further reduce the amount of material, and thus mass, in the radially outermost region of the blade, which has an advantageous effect on the forces acting during operation and on the rub behavior.

The pressure-side recess and the suction-side recess may be formed along a portion of the length of the pressure and suction sides or along the entire length of the pressure and suction sides, respectively. It is also conceivable that a plurality of recesses may be formed in each of the pressure and suction sides. As a result, the end portion is formed at least partly as a projection which projects radially from the airfoil and forms the blade tip. When the turbine stage or aircraft gas turbine is in an assembled state, the end portion of the blade may be disposed opposite a stator-side rub surface. The rub surface may, for example, have a honeycomb structure.

The blade may be made of a brittle material, such as a titanium aluminide alloy. Moreover, the blade may be cast or forged or/and additively manufactured, for example by (selective) electron beam melting (EBM). The term "brittle materials" (e.g., TiAl) is understood to refer to materials in which a maximum total elongation of <2% occurs at room temperature.

The airfoil may have material thickenings, at least in some regions, in particular an at least locally thickened leading edge. This makes it possible to counteract damage caused by the increased foreign particle energy, in particular impacts.

The airfoil and/or the sealing element may have a hardfacing formed thereon, at least in some regions, the hardfacing being made from a material different from the material of the blade, in particular from a ceramic material or a Ni-based material. Such a partial or complete hardfacing allows the blade to be reinforced to counteract damage. In order to improve the radial clearance, a hardfacing in the region of the end portion makes possible an abradable system where, during operation, the hardfaced end portion of the blade is moved as closely as possible along a stator-side rub surface.

Alternatively, the end portion may have provided thereon a top piece or kind of a crown made of a relatively soft material, the top piece being adapted to be abraded during rubbing into the stator-side rub surface. In addition, the softer material of such a top piece is selected such that it will not be damaged by the flow of hot gas.

The blade may have a radial surface profile that is configured such that a static mean stress of less than 150 MPa is obtained in all sections of the blade profile.

Also provided is a turbine stage for a gas turbine, in particular an aircraft gas turbine, having a plurality of above-described blades arranged adjacent one another in the circumferential direction. In such a turbine stage, circumferentially adjacent blades may be configured to have different natural frequencies. To this end, adjacent blades may differ, for example, in the geometry of the airfoil.

Finally, there is also provided an aircraft engine having an above-mentioned high-speed turbine stage, where, during operation of the aircraft engine, the turbine stage rotates faster than a fan of the aircraft engine. Thus, this aircraft engine is an aircraft engine having what is known as a geared fan; i.e., a geared turbofan (GTF).

BRIEF DESCRIPTION OF THE DRAWINGS

The invention will now be described, by way of example and not by way of limitation, with reference to the accompanying drawings.

FIGS. 2A and 2B show highly simplified, schematic top views of two examples of shroudless blades for a turbine stage;

FIG. 3 is a schematic and simplified cross-sectional view through the blade, taken substantially along line in FIGS. 2A and 2B;

FIG. 4 is a schematic representation of a blade and its chord lengths.

DETAILED DESCRIPTION

Figure 1:
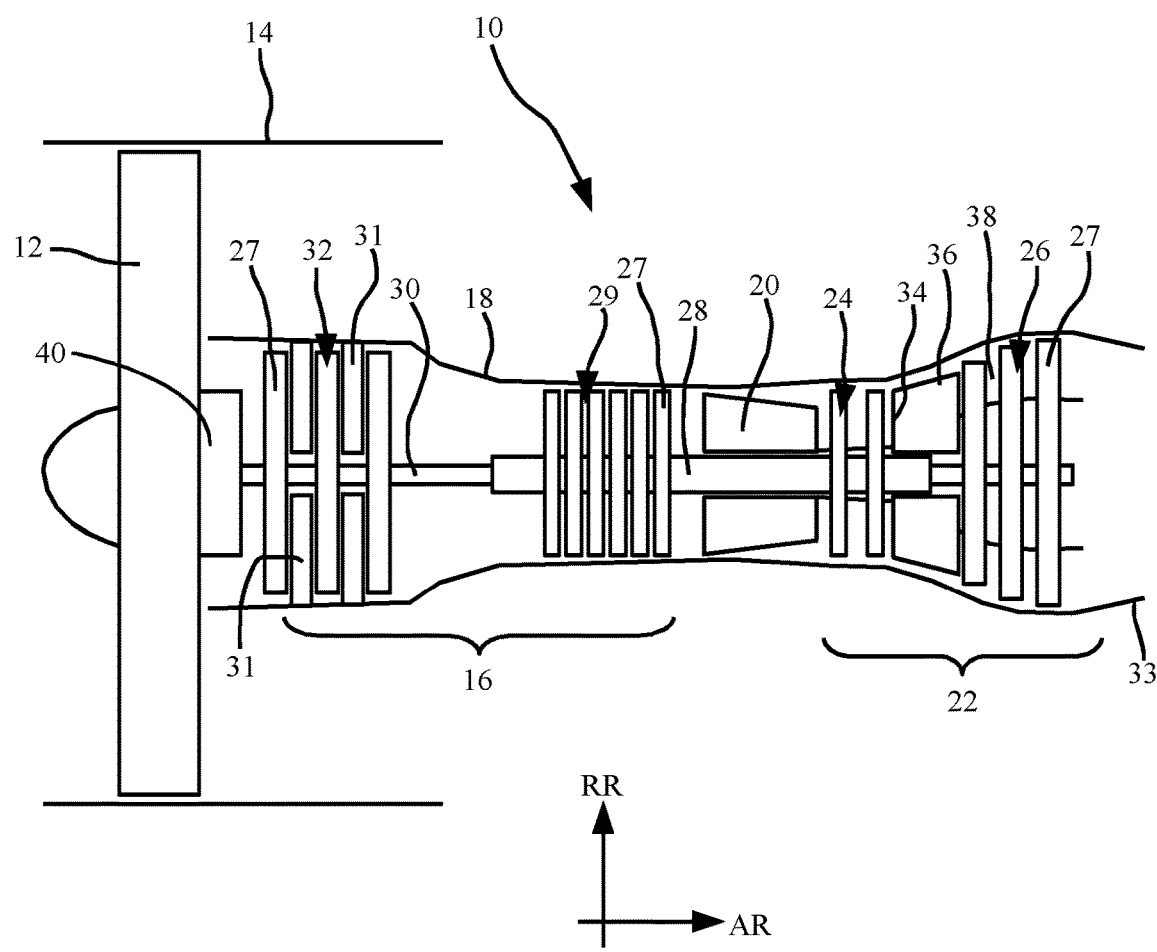
FIG. 1 is a simplified schematic representation of an aircraft gas turbine or aircraft engine.

FIG. 1 shows, in simplified schematic form, an aircraft gas turbine 10, illustrated, merely by way of example, as a turbofan engine. Gas turbine 10 includes a fan 12 that is surrounded by a schematically indicated casing 14. Disposed downstream of fan 12 in axial direction AR of gas turbine 10 is a compressor 16 that is accommodated in a schematically indicated inner casing 18 and may be single-stage or multi-stage. Disposed downstream of compressor 16 is combustor 20. Hot exhaust gas discharging from the combustor then flows through subsequent turbine 22, which may be single-stage or multi-stage. In the present example, turbine 22 includes a high-pressure turbine 24 and a low-pressure turbine 26. A hollow shaft 28 connects high-pressure turbine 24 to compressor 16, in particular a high-pressure compressor 29, so that they are jointly driven or rotated. Another shaft 30 located further inward in the radial direction RR of the turbine connects low-pressure turbine 26 to fan 12 and to a here low-pressure compressor 32 so that they are jointly driven or rotated. Disposed downstream of turbine 22 is an exhaust nozzle 33, which is only schematically indicated here.

In the illustrated example of an aircraft gas turbine 10, a turbine center frame 34 is disposed between high-pressure turbine 24 and low-pressure turbine 26 and extends around shafts 28, 30. In other designs, instead of a turbine center frame 34, only an intermediate duct may be provided between high-pressure turbine 24 and low-pressure turbine 26. Hot exhaust gases from high-pressure turbine 24 flow through turbine center frame 34 in its radially outer region 36. The hot exhaust gas then flows into an annular space 38 of low-pressure turbine 26. Compressors 29, 32 and turbines 24, 26 are represented, by way of example, by rotor blade rings 27. For the sake of clarity, the usually present stator vane rings 31 are shown, by way of example, only for compressor 32.

In this example, low-pressure turbine 26 and fan 12 are coupled by a gearbox 40, shown only schematically here, in particular a planetary gear. In this way, low-pressure turbine 26 becomes what is known as a high-speed turbine stage, which rotates at a higher speed than fan 12. The direction of rotation of low-pressure turbine 26 may be the same as or different from that of fan 12.

The following description of an embodiment of the invention relates in particular to a turbine stage of low-pressure turbine 26, in which a plurality of blades 42 are arranged adjacent one another in the circumferential direction. FIG. 2 shows two examples of blades 42 in simplified, schematic top views, looking at a radially outer portion or blade tip portion.

Blade 42 has an end portion 44 at its radially outer end. Extending radially inwardly from end portion 44 is the airfoil 46. As is typical, airfoil 46 has a pressure side 45 and a suction side 47. In the radially outer region, at least one recess 49 is provided in pressure side 45. Furthermore, at least one recess 51 is provided in suction side 47. As can be seen in the examples of FIGS. 2A and 2B, end portion 44 is disposed between recesses 49, 51. End portion 44 projects outwardly from airfoil 46 in radial direction RR. This is particularly apparent from the simplified cross-sectional view of FIG. 3.

Pressure-side recess 49 may be formed along a portion of the length of pressure side 45. Likewise, recess 51 may be formed along a portion of the length of suction side 47. This is shown in the example of FIG. 2A. Alternatively, recesses 49, 51 may be formed along the entire length of pressure side 45 and suction side 47, respectively. It should be noted that in FIGS. 2A and 2B, the arrangement of end portion 44 and recesses 49, 51 is neither reproduced true to scale, nor true to shape.

The provision of recesses 49, 51 in the radially outer region of the blade 42 makes it possible to reduce the mass of blade 42, which has an advantageous effect on the forces acting on blade 42 during operation.

In addition to the provision of end portion 44, which is disposed or extends between recesses 49, 51, blade 42; i.e., its airfoil 46, may have different chord lengths Si and Sa in the radially inward and radially outward regions thereof, which is illustrated, by way of example, in FIG. 4. Chord lengths Si and Sa are measured between a leading edge 50 and a trailing edge 52 of airfoil 46, which is also shown in FIG. 2A for blade 42.

The radially inner chord length Si is determined above a blade root 54. The radially outer chord length Sa is determined below end portion 44. The inner chord length Si is about 1.1 times to 1.4 times the outer chord length Sa.

End portion 44 or/and leading edge 50 of airfoil 46 may have provided thereon a material deposit 56 that serves to hardface the remainder of the blade material. Blade 42 may in particular be made from a titanium aluminide (TiAl). A hardfacing 56 on end portion 44 or leading edge 50 may be made from a ceramic material or a Ni-based material, such as, for example, boron nitride. Material deposit 56 on end portion 44 may also be made of a softer material so that, during operation, blade 4 or end portion 44 can rub into a stator-side rub surface, whereby material deposit 56 is abraded during operation of blade 42. In other words, it may be said generally that end portion 44, whether with or without a material deposit 56, is designed such that, in cooperation with a stator-side ring surface or annular rub surface, is capable of sealing an annular gap.

LIST OF REFERENCE CHARACTERS

10 aircraft gas turbine
12 fan
14 casing
16 compressor
18 casing
20 combustor
22 turbine
24 high-pressure turbine
26 low-pressure turbine
27 rotor blade ring
28 hollow shaft
29 high-pressure compressor
30 shaft
31 stator vane ring
32 low-pressure compressor
33 exhaust nozzle
34 turbine center frame
36 radially outer region
38 annular space
40 gearbox
42 blade
44 end portion
45 pressure side
46 airfoil
47 suction side
49 recess
50 leading edge
51 recess
52 trailing edge
54 blade root
56 material deposit/hardfacing
AR axial direction
RR radial direction
Si radially inner chord length
Sa radially outer chord length
UR circumferential direction

What is claimed is:

1. An aircraft engine comprising:
   a fan; and
   a turbine stage including at least one blade including:
      a radially inner blade root; and
      an airfoil extending radially outwardly from the blade root;
      the blade being shroudless and the airfoil having a radially outer end portion positionable opposite a rub surface when the blade is in an installed state, and
      the airfoil having a radially inner chord length at least 1.1 times a radially outer chord length, the inner chord length being measured at the airfoil directly above the blade root, and the outer chord length being measured at the airfoil in a region of or below the radially outer end portion;
   the turbine stage being a high-speed turbine stage so that during operation of the aircraft engine, the turbine stage rotates faster than the fan.

2. The aircraft engine as recited in claim 1 wherein the blade is designed or suitable for an $An^2$ of $\geq 4000$ m2/s$^2$ at or around the ADP of the aircraft gas turbine.

3. The aircraft engine as recited in claim 2 wherein the $An^2$ is $\geq 4500$ m$^2$/s$^2$.

4. The aircraft engine as recited in claim 3 wherein the $An^2$ is $\geq 5000$ m$^2$/s$^2$.

5. The aircraft engine as recited in claim 1 wherein in the region of the radially outer end portion, the airfoil has at least one pressure side recess and at least one suction side recess, the end portion being disposed between the pressure-side recess and the suction-side recess.

6. The aircraft engine as recited in claim 5 wherein the pressure-side recess and the suction-side recess are formed along only a portion of the length of the pressure side and the suction side, respectively.

7. The aircraft engine as recited in claim 5 wherein the pressure-side recess and the suction-side recess are formed along an entire length of the pressure side and the suction side, respectively.

8. The aircraft engine as recited in claim 1 wherein the blade is made of a brittle material.

9. The aircraft engine as recited in claim 8 wherein the brittle material is a titanium aluminide alloy.

10. The aircraft engine as recited in claim 8 wherein the blade is made by casting, forging or additive manufacturing.

11. The aircraft engine as recited in claim 1 wherein the airfoil is provided with material thickenings, at least in some regions.

12. The aircraft engine as recited in claim 11 wherein the material thickenings are a locally thickened leading edge.

13. The aircraft engine as recited in claim 1 wherein the airfoil has a hardfacing formed thereon, at least in some regions, the hardfacing being made from a material different from the material of the blade.

14. The aircraft engine as recited in claim 13 wherein the hardfacing is made from a ceramic material or a Ni-based material.

15. The aircraft engine as recited in claim 13 wherein the hardfacing is at the radially outer end region.

16. The aircraft engine as recited in claim 1 wherein the blade has a radial surface profile that is configured such that a static mean stress of less than 150 MPa is obtained in all sections of the blade profile.

17. The aircraft engine as recited in claim 1 wherein the radially inner chord length is at least 1.2 times the radially outer chord length.

18. The aircraft engine as recited in claim 1 wherein the radially inner chord length is at least 1.3 times the radially outer chord length.

19. The aircraft engine as recited in claim 1 wherein the at least one blade includes a plurality of blades arranged adjacent one another in the circumferential direction.

20. The aircraft engine as recited in claim 19 wherein the blades arranged adjacent one another in the circumferential direction are configured to have different natural frequencies.

21. The aircraft engine as recited in claim 1 further comprising a first shaft and a gearbox connecting the turbine stage to the fan, and a further turbine stage and a compressor, the further turbine stage and the compressor being connected by a hollow shaft, the first shaft being inside the hollow shaft.

22. The aircraft engine as recited in claim 21 further comprising a turbine center frame between the turbine stage and the further turbine stage.

* * * * *